United States Patent [19]

Bando

[11] Patent Number: 4,596,179
[45] Date of Patent: * Jun. 24, 1986

[54] RECIPROCATING MACHINE

[75] Inventor: Shigeru Bando, Tokushima, Japan

[73] Assignee: Bando Kiko Co., Ltd., Tokushima, Japan

[*] Notice: The portion of the term of this patent subsequent to Dec. 4, 2001 has been disclaimed.

[21] Appl. No.: 624,121

[22] Filed: Jun. 25, 1984

Related U.S. Application Data

[63] Continuation-in-part of Ser. No. 433,145, Oct. 6, 1982, Pat. No. 4,485,728.

[30] Foreign Application Priority Data

| Oct. 12, 1981 | [JP] | Japan | 56-163197 |
| Nov. 21, 1981 | [JP] | Japan | 56-187174 |
| Dec. 19, 1981 | [JP] | Japan | 56-205679 |
| May 12, 1982 | [JP] | Japan | 57-69860 |

[51] Int. Cl.$^4$ .................... F16J 1/02; F16C 29/04
[52] U.S. Cl. ........................ 92/178; 384/52; 384/58
[58] Field of Search ............ 92/178; 403/146, 147, 403/162; 308/6 R, 6 A, 6 B, 6 C, 4 R, 207 A, 207 R, 184 R, 184 A, 206

[56] References Cited

U.S. PATENT DOCUMENTS

| 632,950 | 9/1899 | Spencer et al. | 92/178 |
| 1,542,209 | 6/1925 | Bergeron | 403/147 |
| 2,328,918 | 9/1943 | McManus | 308/6 R |
| 2,344,808 | 3/1944 | Duffield et al. | 403/146 |
| 3,398,653 | 8/1968 | Foster | 92/178 |

FOREIGN PATENT DOCUMENTS

| 183938 | 2/1906 | Fed. Rep. of Germany . | |
| 447475 | 7/1927 | Fed. Rep. of Germany . | |
| 938521 | 1/1956 | Fed. Rep. of Germany . | |
| 55074 | 6/1951 | France | 92/178 |
| 54-68011 | 5/1979 | Japan . | |
| 217312 | 6/1924 | United Kingdom . | |
| 349213 | 5/1931 | United Kingdom . | |
| 479967 | 2/1938 | United Kingdom . | |
| 703402 | 2/1954 | United Kingdom . | |

Primary Examiner—Edward K. Look
Assistant Examiner—H. Edward Li
Attorney, Agent, or Firm—Oblon, Fisher, Spivak, McClelland & Maier

[57] ABSTRACT

A reciprocating engine comprising a cylinder, a piston performing reciprocating movement within the cylinder, a crank shaft performing rotational movement, a connecting rod connected rotatably at its one end to the crank shaft and at its the other end to the piston, and rollers each mounted on the side portion of the piston, in which the piston is in rolling contact with the cylinder through the rollers.

9 Claims, 15 Drawing Figures

RECIPROCATING MACHINE

CROSS-REFERENCE TO RELATED APPLICATION

This invention is a continuation-in-part of application Ser. No. 433,145, filed Oct. 6, 1982, U.S. Pat. No. 4,485,728.

This invention relates to a reciprocating machine with reduced frictional resistance between a piston and a cylinder.

Reciprocating machines such as reciprocating engines, reciprocating compressors or reciprocating pumps are well-known.

In a reciprocating machine, for example, a reciprocating engine, a connecting rod that connects a piston with a crank shaft performs lateral oscillating movements during reciprocating movements of piston within a cylinder in order to transmit the rotational force to the crank shaft, then, side thrust of the piston due to the lateral oscillating movements of the connecting rod is applied to the cylinder. The side thrust is exerted from the outer circumferential surface of the piston to the inner circumferential surface of the cylinder on a plane defined by the lateral oscillating movements of the connecting rod. Thus, the action of the side thrust induces a considerable frictional contact between the inner circumferential surface of the cylinder and the outer circumferential surface of the piston thereby resulting in rather large loss of friction.

In order to prevent such loss of friction caused from the action of the side thrust, various counter measures have been employed such as by offsetting the position of the piston pin that connects the piston and the connecting rod or minimizing the gap between the piston and the cylinder as much as possible.

Further, in order to decrease the frictional loss due to the action of the side thrust, an attempt has hitherto been made to mount the rollers on the piston. However, since a clearance between the outer circumferential surface of the piston and the inner circumferential surface of the cylinder varies depending on the thermal expansion of the piston and the cylinder, the rollers mounted to the piston are excessively urged to or aparted from the inner circumferential surface of the cylinder, so that no smooth rolling can be obtained for the rollers on the inner circumferential of the cylinder thus failing to attain effective reduction in the frictional loss.

This invention has been made in view of the foregoing problems and it is an object of this invention to provide a reciprocating machine capable of ensuring the reduction in the frictional resistance between the inner circumferential surface of the cylinder and the outer circumferential surface of the piston, thereby substantially decreasing the loss of friction.

Another object of this invention is to provide a reciprocating engine having a cylinder-piston assembly in which rollers mounted to a piston can surely be in rolling contact with the inner circumferential surface of a cylinder to surely reduce the frictional loss due to the action of the side thrust even in a case where the clearance between the outer circumferential surface of the piston and the inner circumferential surface of the cylinder varies depending on the thermal expansion of the piston and the cylinder.

The reciprocating machine according to this invention comprises a support, a reciprocating member performing reciprocating movement within the support, a crank shaft performing rotational movement, a connecting rod connected rotatably at its one end to the crank shaft and at its the other end to the reciprocating member and rolling means mounted on the side portion of the reciprocating member, in which the reciprocating member is in rolling contact with the support through the rolling means.

Accordingly, in the reciprocating machine of this invention, since the reciprocating member is in rolling contact with the support through the rolling means, the frictional resistance between the support and the reciprocating member can surely be reduced thereby enabling a substantial decrease in the loss of friction.

In this invention, the reciprocating member may be a piston or a cross head as an auxiliary piston interconnecting with the piston and the support may be a cylinder in which the piston reciprocates or a support member in which the cross head reciprocates.

This invention may be applied a reciprocating engine, a reciprocating compressor, a reciprocating pump or the like.

The reciprocating engine according to this invention comprises a cylinder, a piston reciprocating in said cylinder, a connecting rod operatively connecting said piston with a crank shaft, at least two openings formed on both sides of the skirt of the piston, a shaft mounted in each of the openings and extending in a direction perpendicular to the axis of the piston, at least one pair of rollers each mounted on the shaft movably along the axis of the shaft and projecting outwardly from the outer circumferential surface of the piston to be in rolling contact with the inner circumferential surface of the cylinder and biasing means disposed between the rollers on the shaft for resiliently urging the rollers away from each other in the axial direction of the shaft.

Accordingly, in the reciprocating engine of this invention, since at least a pair of rollers projecting outwardly from the outer circumferential surface of the piston are in rolling contact with the inner circumferential surface of the cylinder and the rollers can move axially on the shaft against the biasing means even in a case where the clearance between the outer circumferential surface of the piston and the inner circumferential surface of the cylinder varies depending on the thermal expansion of the piston and the cylinder during operation of the engine, the rollers can always be maintained in rolling contact with the inner circumferential surface of the cylinder, and can prevent the outer circumferential surface of the piston from coming in considerable frictional contact with the circumferential surface of the cylinder due to the action of the side thrust of the piston thus to enable effective reduction in the frictional loss.

At least two openings mentioned above are preferably, disposed on opposite sides of the skirt area of the piston on a plane defining the lateral movements of the connecting rod in use. Each roller in at least one pair of rollers has such a shape that the cross-sectional profile of the roller in the axial direction of the shaft corresponds to the configuration of the inner circumferential surface of the cylinder, so that no localized load may be applied from the cylinder wall to the roller.

This invention will now be explained by way of preferred embodiments of a reciprocating machine which is not necessarily limited only to a reciprocating engine to be illustrated and described specifically hereinafter but includes a reciprocating compressor and a reciprocating pump as well, wherein, FIG. 1 is a longitudinal sectional view of a preferred embodiment of this invention, in which a piston is partially shown in cross section, FIG. 2 is a plan view of the reciprocating engine shown in FIG. 1 with a cylinder head being removed, in which a piston is partially shown in cross section, FIG. 3 is a longitudinal sectional view of a part of another embodiment of the reciprocating engine according to this invention, in which a piston is partialy shown in cross section, FIG. 4 is a plan view of the reciprocating engine shown in FIG. 3 with a cylinder head being removed, in which a piston is partially shown in cross section, FIG. 5 is a longitudinal sectional view of a further embodiment according to this invention, in which a piston is partially shown in cross section, FIG. 6 is a plan view of the reciprocating engine shown in FIG. 5 with a cylinder head being removed, in which a piston is partially shown in cross section, FIG. 7 is an enlarged cross sectional view of a part of the piston shown in FIG. 6, and FIG. 8 is an explanatory view of a still further embodiment according to this invention.

Figure 1:
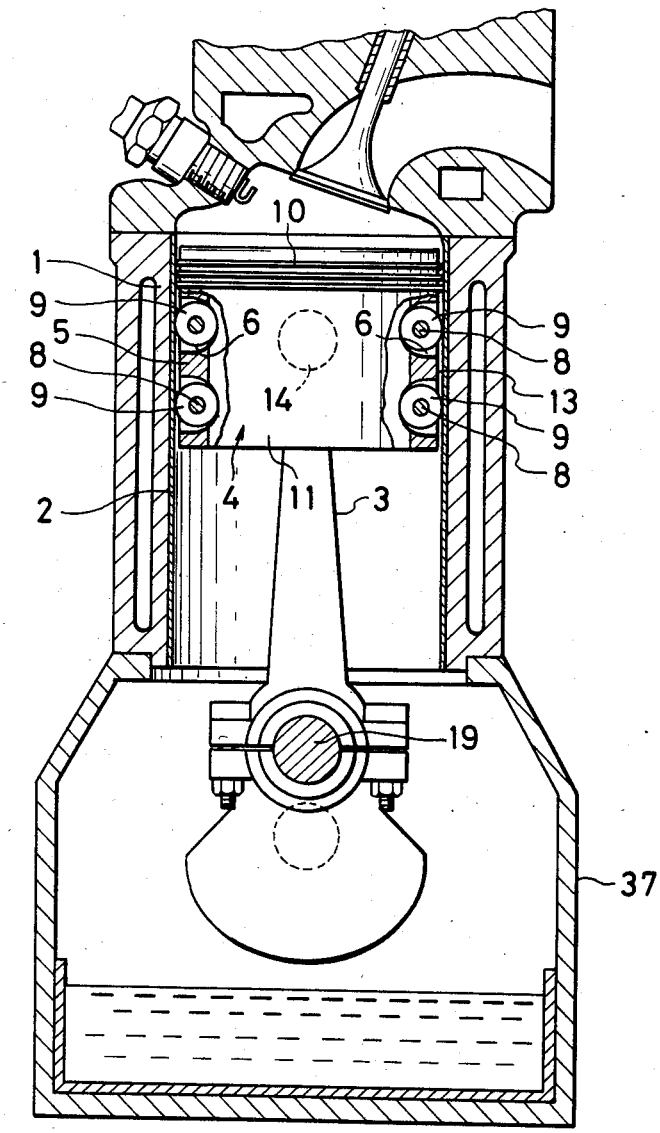

Numeral 1 is a cylinder as the support. Numeral 2 is a cylinder liner or an inner wall of the cylinder 1. Numeral 3 is a connecting rod. Numeral 4 is a piston as the reciprocating member. The piston 4 is provided with openings 6 at the side portion 5 thereof. The openings 6 are arranged on the actuation plane of the connecting rod 3, that is, on a plane 12 defined by the lateral oscillating movements of the connecting rod 3 (shown by the dotted chain line in FIG. 2) each by two, at upper and lower positions on both sides of the piston 4. In each of the four openings 6, a roller 9 as rolling means is rotatably mounted on the piston 4 through a pin 8, each end of the pin 8 secured to the side wall 7 of the opening 6. Each of the rollers 9 is arranged at a skirt area 11 of the piston 4 below piston rings 10 where the side thrust of the piston 4 is applied by way of the inner wall 2. Each of the rollers 9 is slightly projected radially out of the outer circumferential surface 13 of the piston 4 and in rolling contact with the inner wall 2 of the cylinder 1. Each of the rollers 9 comprises a rolling bearing such as a ball bearing, needle bearing or roller bearing and the cross sectional profile of the roller 9 in the axial direction of the pin 8 has an arcuate shape corresponding to the configuration of the inner circumferential surface of the inner wall 2. Each of the rollers 9 has reliable durability for impact load or violent force of inertia and exceeding heat. The connecting rod 3 is connected pivotably at its one end to the crank shaft 19 and at its other end to the piston 4 through the piston pin 14. Numeral 37 is crank casing. The lubricant is supplied to the rollers 9, the outer circumferential surface 13 of the piston 4, the inner wall 2 and piston pin 14, respectively while the piston 4 reciprocates within the cylinder 1.

In the reciprocating engine having the foregoing structure, the piston 4 reciprocates within the cylinder 1, while the connecting rod 3 repeats the lateral oscillating movements on the plane 12, by which the side thrust of the piston 4 is exerted on the inner wall 2 of the cylinder 1. In this embodiment, since a plurality of rollers 9 are mounted on the side portion 5 of the piston 4 on the plane 12 and the rollers 9 are respectively in rolling contact with the inner wall 2, each of the rollers 9 effectively prevents the outer circumferential surface 13 of the piston 4 from coming in considerable frictional contact with the inner wall 2 of the cylinder 1 due to the action of the side thrust of the piston 4, thereby enabling to reduce the frictional resistance between the outer circumferential surface 13 and the inner wall 2 and thus provide a substantial decrease in the loss of friction.

As the result of the road test actually carried out on an automobile on which the reciprocating engine of this invention is mounted, the fuel cost can indeed be economized significantly.

Figure 3:
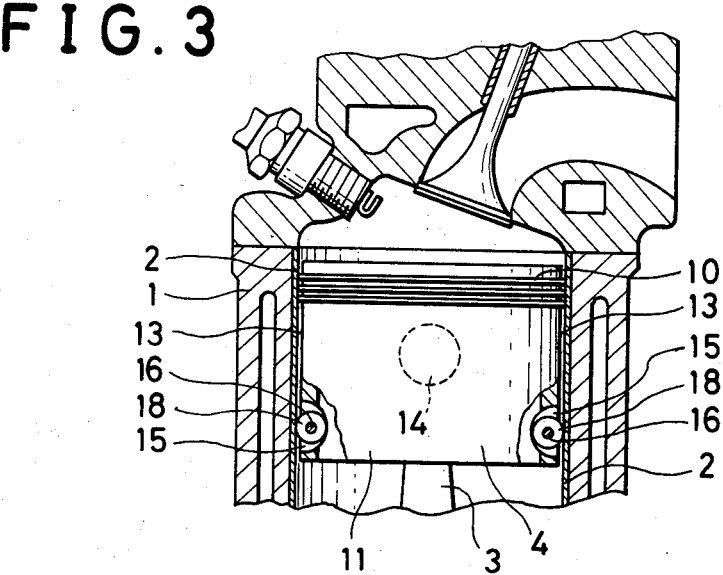
Figure 4:
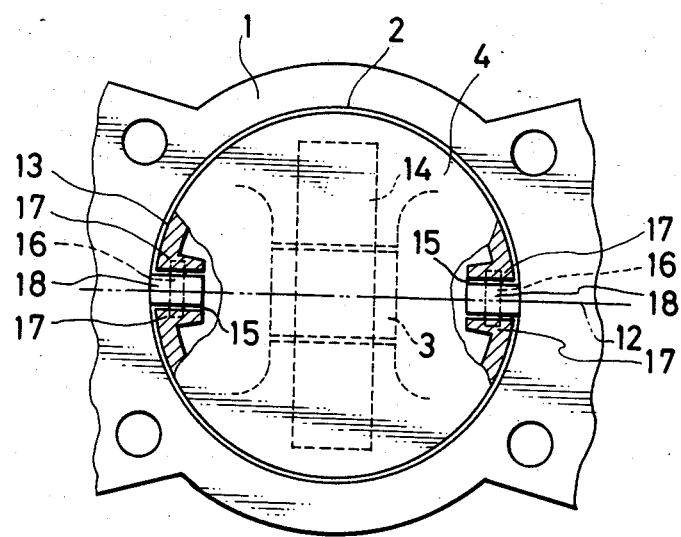

FIG. 3 and FIG. 4 illustrate another embodiment of this invention, in which same components as those in the previous embodiments carry the same numeral. In this embodiment the piston 4 is provided with two openings 15 at the side portion thereof, each of the openings 15 arranged on the plane 12 defined by the lateral oscillating movement of the connecting rod 3 (shown by the dotted chain line in FIG. 4), at the skirt area 11 of the piston 4, the preferred position of the openings 15 being slightly below than that of the piston pin 14. In each of the openings 15, a pin 16 extending in the axial direction of the piston pin 14 is secured at both ends thereof to the side walls 17 of the opening 15 and a roller 18 as rolling means is rotatably mounted on the pin 16. Each of the rollers 18 is slightly projected outwardly from the outer circumferential surface 13 of the piston 4 and adapted to be in rolling contact with the inner wall 2 of the cylinder 1. The roller 18 comprises a ball bearing, a needle bearing or a roller bearing having reliable durability for impact load or violent force of inertia and exceeding heat.

Figure 5:
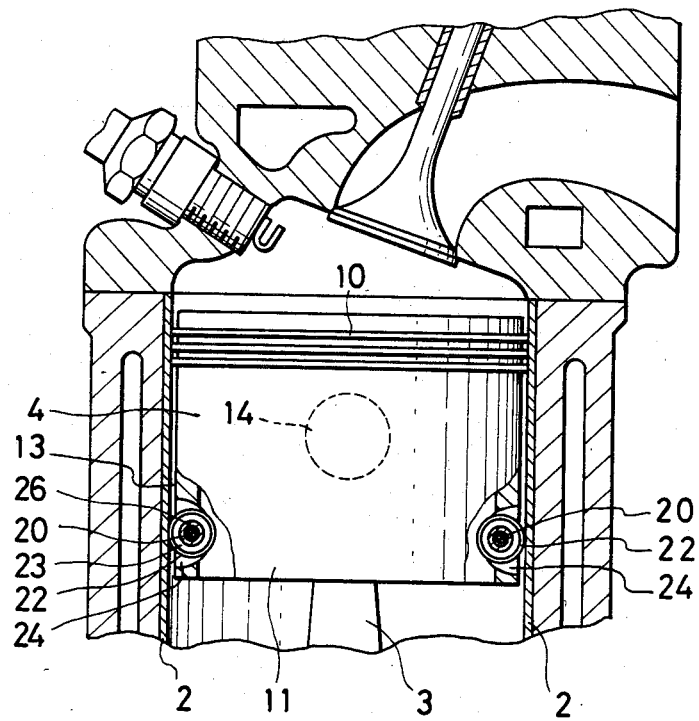
Figure 6:
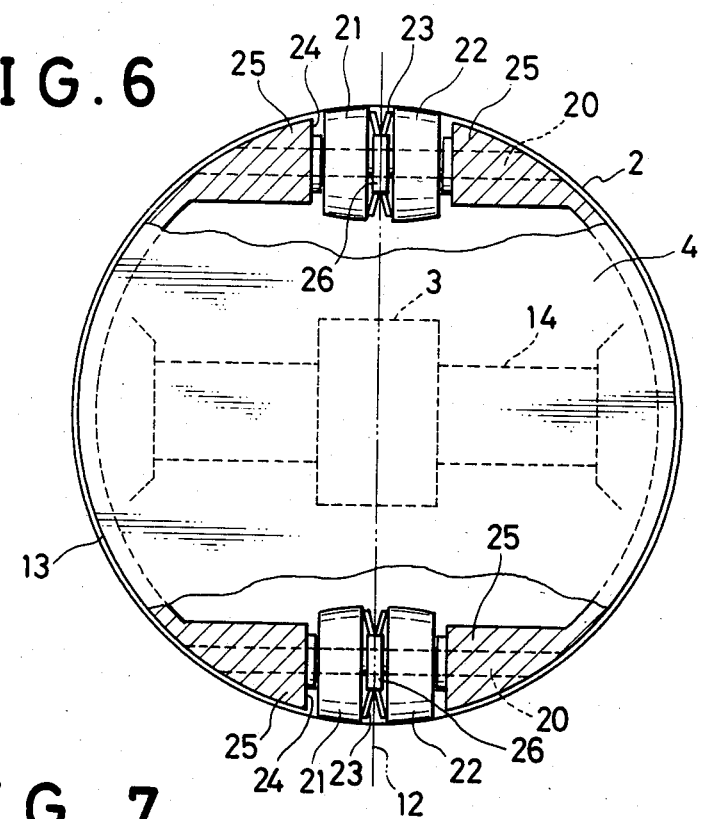
Figure 7:
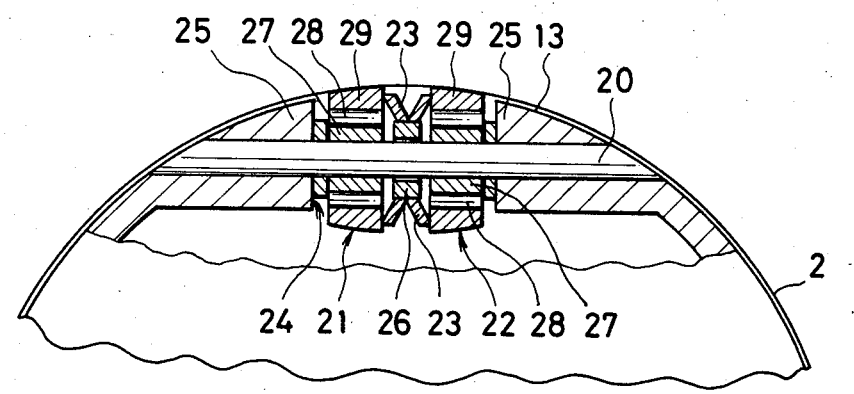

FIG. 5, FIG. 6 and FIG. 7 illustrate a further embodiment in which the same components as those in the previous embodiments carry the same numeral. In this embodiment, each of the rolling means comprises a pin or shaft 20, a pair of rollers 21 and 22 rotatably mounted on the pin 20 and a plurality of leaf springs 23 as resilient biasing means pivotably mounted on the pin 20 between the rollers 21 and 22. Two openings 24 are formed in the circumferential wall of the skirt area 11 of the piston 4 on the plane 12 (shown by the dotted chain line in FIG. 6) and each of the pins 20 is fixed at its both ends to the side walls 25 of the opening 24. The pin 20 is extended in the axial direction of the piston pin 14 and the rollers 21, 22 and a leaf spring retainer 26 are rotatably mounted on the outer circumferential surface of the pin 20. Each of the rollers 21 and 22 comprises a needle bearing or a rollers bearing having an inner ring 27, rolling elements 28 and an outer ring 29. The inner ring 27 is secured to the outer circumferential surface of the pin 20. The inner ring 27 and the outer ring 29 are rotated relative to each other through the rolling elements 28 and also moved relative to each other through the rolling element 28 in the axial direction of the pin 20. The leaf spring retainer 23 is rotatable on the pin 20. A plurality of leaf springs 23 are retained, each at their one end to the retainer 26 and urge, by their the other ends, the outer rings 29 of the rollers 21 and 22 outwardly in the axial direction of the pin 20. The retainer 26 and the leaf springs 23 are rotated integrally with the outer rings 29. The cross sectional profile of each of the outer rings 29 of the rollers 21 and 22 in the axial direction of the pin 20 has an arcuate shape corresponding to the configuration of the inner circumferential surface of the inner wall 2 and the outer rings 29 are in rolling contact at a relatively wide range with the inner wall 2. Each of the outer rings 29 of the rollers 21 and 22 is slightly projected from the outer circumferential surface 13 of the piston 4 and resiliently biased outwardly in the axial direction of the pin 20 by the leaf springs 23 and urged to the inner wall 2 of the cylinder 1. Accordingly, the rollers 21 and 22 can surely be rolled on the inner wall 2 during reciprocation of the piston 4 and kept in rolling contact with the inner wall 2 even when exerted with a violet impact load thrugh the piston 4 and the cylinder 1. Further, the rollers 21 and 22 can receive, owing to the resiliency of the leaf springs 23, the load from the inner wall 2 exerted as the reaction of the side thrust and the thermal expansion of the piston 4, thereby enabling to effectively maintain the rolling contact with the cylinder liner 2. Thus, they can effectively inhibit the considerable frictional contact between the outer circumferential surface 13 of the piston 4 and the inner wall 2 to enable a substantial reduction in the frictional resistance between the outer circumferential surface 13 and the inner wall 2. Further, they can effectively prevent undesired phenomena such as scratches caused to the inner circumferential surface of the inner wall 2.

The leaf springs 23 may be substituted with a pair of belleville springs.

Figure 8:
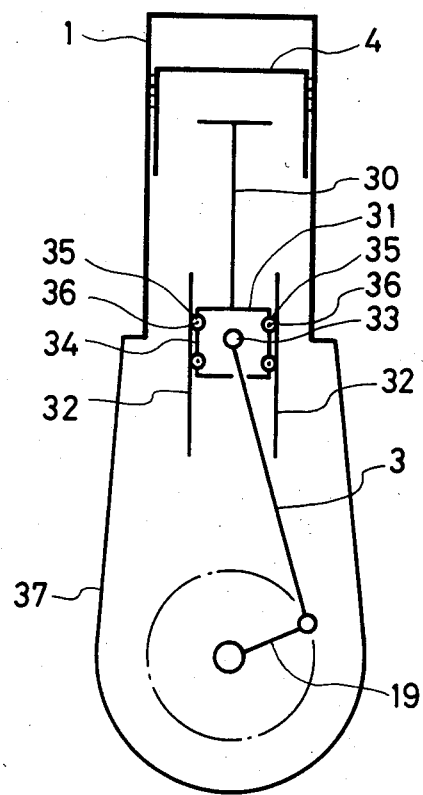

FIG. 8 illustrates a still further embodiment of this invention, in which the same components as those in the previous embodiments carry the same references. In this embodiment, a cross head 31 is connected through a piston rod 30 to a piston 4 that reciprocates within a cylinder 1 and the cross head 31 reciprocates within a support member 32 as support. The connecting rod 3 is connected at its one end pivotably through a pin 33 to the cross head 31 and connected at its the other end pivotably to the crank shaft 19. Rollers 35 as rolling means are pivotably mounted respectively through pins 36 on the side portion 34 of the cross head 31 on the plane defining the lateral oscillating movements of the connecting rod 3, the plane corresponding to the plane 12 in the previous embodiment. The rollers 35, four in total, are provided respectively at the upper and the lower positions of the pin 33 on both sides of the cross head 31. Each of the rollers 35 is adapted to be in rolling contact respectively with the support member 32 so as to inhibit the considerable frictional contact between the cross head 31 and the support member 32. Each of the pins 36 is extended along the axial direction of the pin 33 and secured at both pin ends to the side walls of recess or opening provided on the side portion 34 of the cross head 31. Each of the rollers 35 pivotably mounted on the pin 36 comprises a ball bearing, a roller bearing or a needle bearing, the outer circumferential surface of which is slightly projected out of the side portion 34 of the cross head 31. The support member 32 is supported on the cylinder 1 or the crank casing 37. Instead of the rolling means mounted to the side portion 5 of the piston 4 in the previous embodiments, the rollers 35 as the rolling means are mounted to the cross head 31 as an auxiliary piston interconnecting with the piston 4 in this embodiment. This embodiment is particularly suitable to a reciprocating engine in which the piston 4 thermally expands in a relatively large extent and the side thrust is heavy, for instance, a large-scaled diesel engine or the like. However, each of the previous embodiments shown in FIG. 1–FIG. 7 may also be applied to the engine as shown in FIG. 8, for example the piston 4 is connected through a piston rod to a cross head as an auxiliary piston, which reciprocates within a support member, the cross head and the crank shaft are connected through a connecting rod, so that the reciprocation of the cross head may be converted into the rotational movement of the crank shaft. By providing rolling means to the cross head also in this case, so that the side thrust of the cross head may be applied through the rolling means to the support member, the frictional resistance between the cross head and the support member can be reduced effectively to result in the effective reduction in the frictional resistance between the piston and the cylinder to thereby provide a substantial decrease in the loss of friction.

Figure 2:
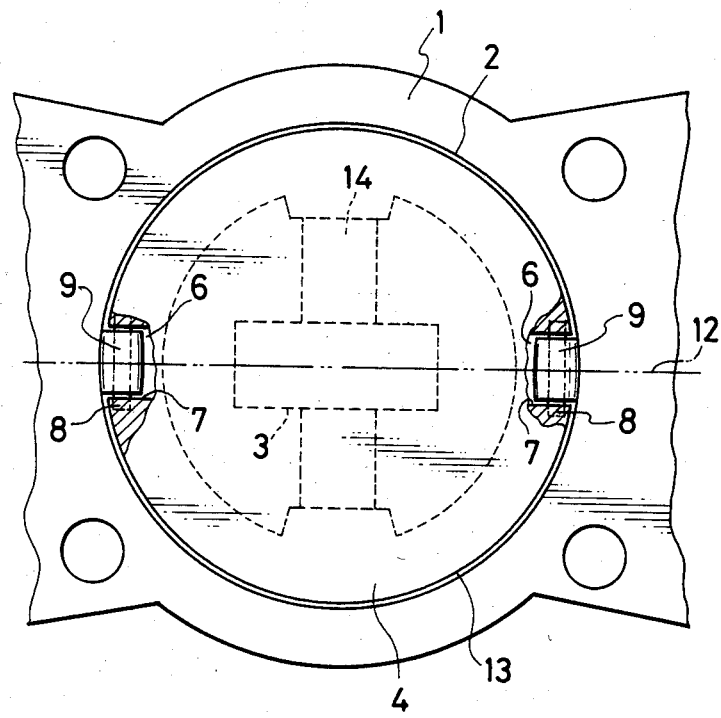

Although the explanations have been made in each of the previous embodiments where this invention is applied to the reciprocating engine, this invention is not limited only to such embodiments but may also be applicable to other reciprocating machines such as a reciprocating compressor, a reciprocating pump or the like. For instance, in the case of a reciprocating compressor or a reciprocating pump, the same rolling means as shown in FIGS. 1 and 3, FIGS. 3 and 4 or FIG. 5 to FIG. 7 may be mounted on the side portion of the piston, so that the piston may be in rolling contact with the cylinder through the rolling means during reciprocation of the piston within the cylinder. Alternatively, the rolling means as shown in FIG. 8 may be mounted on the cross head as the auxiliary piston interconnecting with the piston, so that the cross head may be in rolling contact with the support member through the rolling means during reciprocation of the cross head within the support member. The rolling means in these cases may comprise the rollers 9 as shown in FIG. 2, the rollers 18 as shown in FIG. 4 or paired rollers 21 and 22 as shown in FIG. 7.

In FIGS. 9, 10, 11 and 12 showing a further embodiment of this invention, numeral 41 is a cylinder. Numeral 42 is a piston. Numeral 43 is a connecting rod. The piston 42 has a ring area 44 and a skirt area 45. Two openings 46 are formed on the skirt area 45. The openings 46 are arranged on the opposite sides of the skirt area 45 in the actuation plane of the connecting rod 43, that is, in a plane 47 defined by the lateral movements of the connecting rod 43 shown by the dotted chain line in FIG. 10, the preferred position of the openings 46 being slightly below the piston pin. Rolling means 48 is attached to each of the openings 46. Each rolling means 48 comprises a pin or shaft 49 secured at its axial ends to both side walls of the opening 46 respectively and extending in a direction perpendicular to the plane 47, a pair of rollers 50, 51 rotatably mounted on the shaft 49, and coned disc springs or belleville springs 52 which are disposed between the pair of rollers as biasing means.

The paired rollers 50, 51 comprise roller bearing or needle bearings, in which each of inner rings 53 of the bearings is secured to the shaft 49 and each of outer rings 54 had a cross-sectional profile corresponding to the inner circumferential surface 55 of the cylinder 41 with respect to the axial direction of the shaft 49. Two coned disc springs 52 are arranged to oppose to another two coned disc springs 52, said respective two coned disc springs 52 overlapping each other, in which the outer circumferential edge of the coned disc springs 52 is abutted against the outer ring 54 so that the coned disc springs 52 resiliently urge the two outer rings 54 outwardly in the axial direction A of the shaft 49 so as to apart them from each other. Each of the outer rings 54 is movable in the axial direction of the shaft 49. A ring 56 as retaining means is secured on the shaft 49 between the two inner rings 53, and the coned disc springs 52 rotate together with the outer ring 54 around the ring 56. The radial displacement of the coned disc springs 52 can surely be prevented by the ring 56. Each of the shafts 49 is mounted into lateral through-holes 57 formed in the skirt area 45 at the position corresponding to each of the openings 46.

The rolling means 48 is adapted such that the outer circumferential surface 58 of the rollers 50, 51, and is, the outer circumferential surface 58 of the outer rings 54 as the rolling surface slightly project radially out beyond the outer circumferential surface 59 of the skirt area 45 and are in rolling contact with the inner circumferential surface 55 of the cylinder 41. Each of the outer rings 54 is resiliently biased by the coned disc springs 52 and urged against the inner circumferential surface 55 and thereby resiliently kept to be in rolling contact with the inner circumferential surface 55 of the cylinder 41.

During reciprocation of the piston 42 in the cylinder 41, lubricant is supplied to the outer circumferential surface on the ring area 44 and the skirt area 45 of the piston 42, to the rollers 50, 51 and to the inner circumferential surface 55 of the cylinder 41, so that oil films are formed between the inner circumferential surface 55 of the cylinder 41 and the outer circumferential surface of the piston 42, as well as between the outer circumferential surface 58 of the rollers 50, 51 and the inner circumferential surface 55.

The piston 42 is made of aluminum alloy or aluminum-type light metal and the cylinder 41 is made of cast iron. The inner circumferential surface 55 of the cylinder 41 is applied with a chromium plating.

Piston rings are mounted on the ring area 44 of the piston 42 as a compression ring and an oil ring.

In the reciprocating engine having the foregoing structure, the rollers 50, 51 of the rolling means 48 are kept to be in rolling contact with the inner circumferential surface 55 of the cylinder 41 during reciprocation of the piston 42 in the cylinder 41 to prevent considerable frictional contact between the piston 42 and the cylinder 41 due to the action of the side thrust of the piston 42 thereby reduce the frictional loss.

Figure 12:
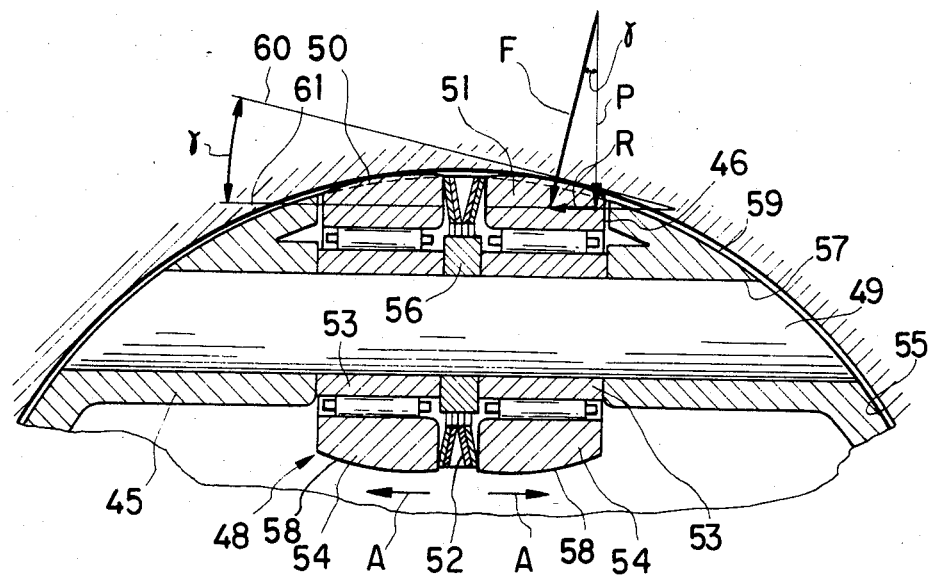
FIG. 12, is an enlarged explanatory view of a part of the reciprocating engine shown in FIG. 10.
Figure 13:
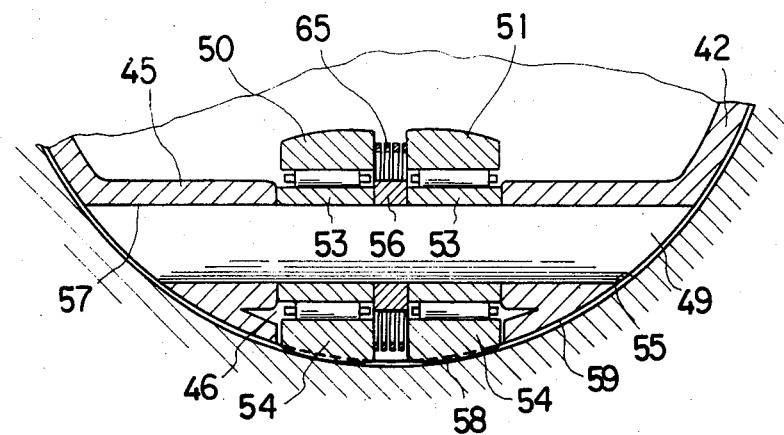
FIG. 13 is an enlarged cross-sectional view of a part of a still further embodiment of the reciprocating engine of this invention.

The relationship between the piston side thrust and the rolling means 48 will now be explained more specifically referring to FIG. 12.

During reciprocation of the piston 42 in the cylinder 41, a reaction force F is exerted from the cylinder 41 to the rolling means 48 as the reaction of the side thrust of the piston 42. The force F can be analyzed into a component R along the axial direction of the shaft 49 and a component P in the direction perpendicular to the axis of the shaft 49. The axial component R compresses the coned disc springs 52 through the outer rings 54, 54 of the rollers 50, 51.

Assuming that an angle $\gamma$ is formed between a tangential line 60 regarding the reaction force F on the outer circumferential surface 58 of the outer ring 54 and a straight line 61 in parallel with the axis of the shaft 49, an identical angle $\gamma$ is also formed between the reaction force F and the component P, and the axial component R can be determined by the following equation (1):

$$R = F \sin \gamma \tag{1}$$

If the diameter of the cylinder 41 is large enough, the angle $\gamma$ is very small and the component R is much smaller as compared with the reaction force F, so that the compressive force applied to the coned disc springs 52 is very small. Accordingly, it is not required to make the biasing force or the resiliency of the coned disc springs 52 so large, and also the reaction force F can satisfactorily be absorbed by the coned disc springs 52.

In addition, even if the clearance between the outer circumferential surface of the piston 42 and the inner circumferential surface 55 of the cylinder 41 is decreased due to the thermal expansion of the piston 42 and the cylinder 41, since the outer rings 54, 54 move in axial direction of the shaft 49 against the resiliency or the biasing force of the disc springs 52, the outer rings 54, 54 can be kept in rolling contact with the inner circumferential surface 55 of the cylinder 41, so that the rolling means 48 are kept to roll or move rotationally on the inner circumferential surface 55.

Accordingly, the rolling means 48, 48 are kept to roll on the inner circumferential surface 55 in a pre-loaded condition under the action of the coned disc springs 52 during reciprocation of the piston 42, whereby the rolling means 48, 48 can surely be prevented from bouncing on the inner circumferential surface 55 to ensure that the rolling means 48, 48 and the piston 42 are not collide against the inner circumferential surface 55 of the cylinder 41, and rolling means 48, 48 prevent undesired phenomena such as scratches on the inner circumferential surface 55.

In the above-described embodiment, although biasing means comprise four coned disc springs 52, the biasing means are not restricted only thereto in this invention.

For instance, the biasing means can be constituted with a coil spring 65, so that the outer rings 54, 54 of the rollers 50, 51 may be biased outwardly in the axial direction by the coil spring 65 to maintain the rolling contact between the outer rings 54, 54 and the inner circumferential surface 55 of the cylinder 41.

Figure 14:
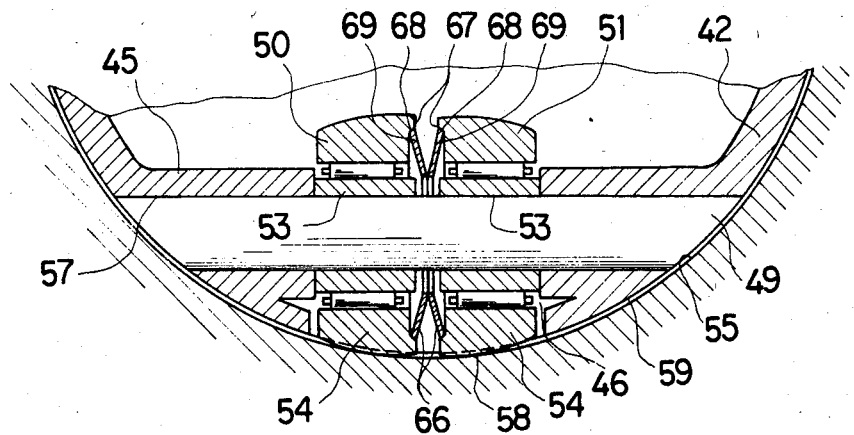
FIG. 14 and FIG. 15 are an enlarged cross-sectional view of a part of further embodiments according to this invention, respectively.
Figure 15:
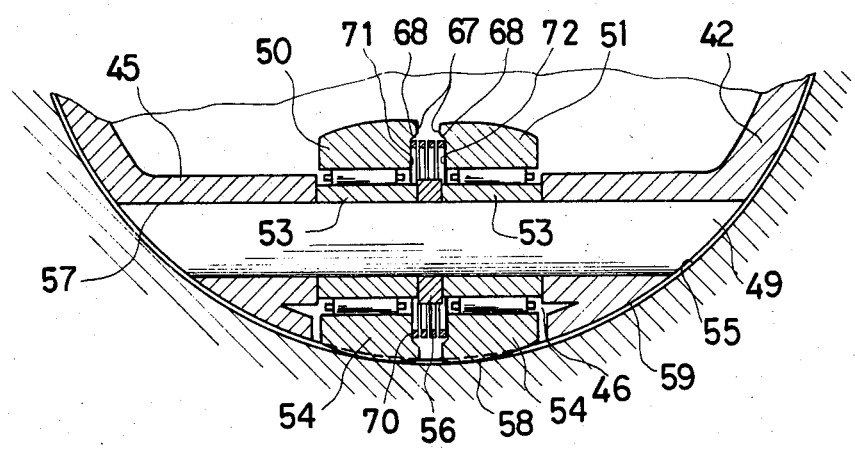

Further, as shown in FIG. 14, the biasing means may also be constituted with two coned disc springs 66. In this embodiment, two coned disc springs 66, 66 are disposed opposing to each other and urge the outer rings 54, 54 outwardly in the axial direction. Furthermore, instead of providing a ring between the inner rings 53, 53, steps 68, 68 are formed on the opposing faces 67, 67 of the outer rings 54, 54 respectively, in which outer circumferential edges 69, 69 of coned disc springs 66, 66 are abutted against the steps 68, 68 respectively to prevent relative movement between the coned disc springs 66, 66 and the outer rings 54, 54.

Instead of the coned disc springs, the biasing means may be constituted with a coil or spiral spring 70 which is situated between annular recesses 71 and 72, as retaining means, respectively defined by the annular steps 68 and 68 on the faces 67 and 67.

Alternately, in all of the above embodiments, the inner rings 53, 53 may be replaced with a single tubular member extended in the axial direction of the shaft 49.

Further, openings disposed on opposite sides of the skirt area of the piston in the plane defining the lateral movement of the connecting rod may be disposed, each by more than two, along the axis of the piston at upper and lower positions of the piston pin and rolling means may be mounted respectively to each of the openings.

Figure 9:
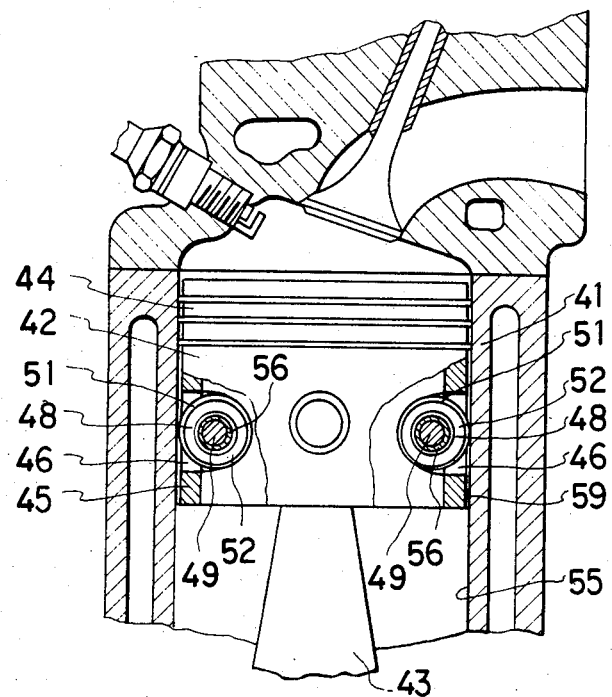
FIG. 9 is a longitudinal sectional view of a further preferred embodiment of the reciprocating engine according to this invention, in which a piston is partially shown in cross section.
Figure 10:
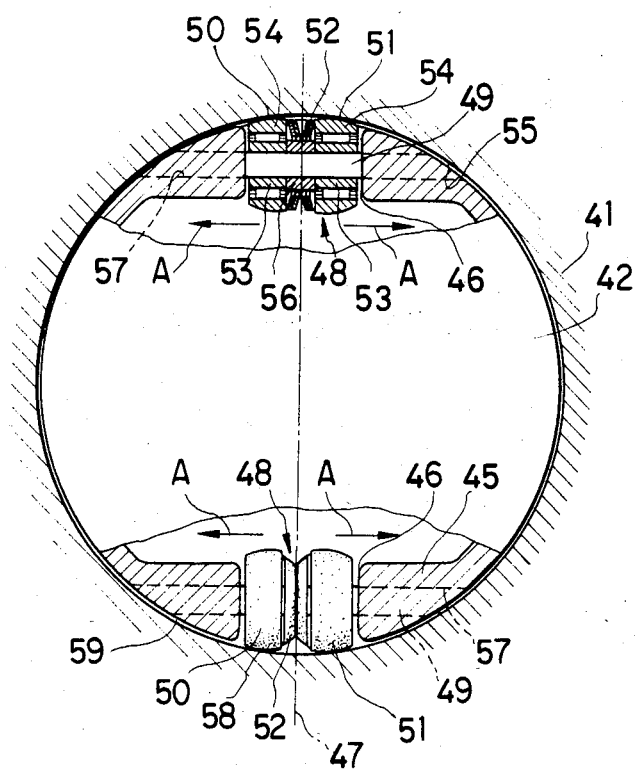
FIG. 10 is an englarged cross-sectional view of the reciprocating engine shown in FIG. 9, in which a piston and rolling means are partially shown in transversing cross sections.
Figure 11:
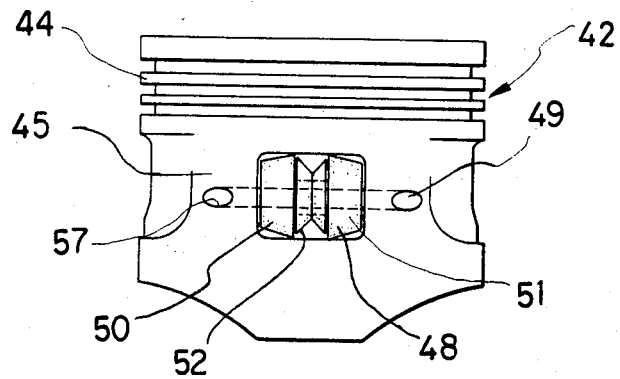
FIG. 11 is a side elevational view of the piston shown in FIG. 9.

Furthermore, although a specific embodiment for a 4-cycle gasoline engine is shown in FIG. 9, the reciprocating engine according to this invention is not restricted merely to 4-cycle gasoline engines but can be applied to various types of reciprocating engines such as two-cycle gasoline engines or diesel engines.

As stated above, in the reciprocating engine according to this invention, since a pair of rollers are resiliently urged or biased outwardly in the axial direction of the shaft by the biasing means and each of the rollers is kept in rolling contact with the inner circumferential surface of the cylinder, the rollers can move in the axial direction of the shaft when a clearance between the piston and the cylinder varies depending on the thermal expansion of the piston during operation of the engine, the rollers can always be maintained in a reliable rolling contact with the inner circumferential surface of the cylinder and the rollers effectively prevent the piston from coming in considerable frictional contact with the cylinder due to the action of the side thrust of the piston to thereby enable effective reduction in the frictional loss.

In addition, since the biasing means can resiliently absorb the reaction force F exerted from the cylinder to the roller due to the action of the side thrust of the piston, the biasing means can surely moderate the shock caused by the reaction force F. Furthermore, since the shaft is extended in a direction perpendicular to the axis of the piston and a pair of roller movable in the axial direction of the shaft are resiliently urged in the axial direction by the biasing means disposed between the pair of rollers, the biasing means have only to receive the axial component R of the reaction force F and the resiliency or the biasing force of the biasing means is not required to be so large. Accordingly, the biasing means can surely absorb the reaction force due to the action of the side thrust of the piston even in the case where this invention is applied to a diesel engine or the like having a relatively large piston side thrust. Furthermore, since the rollers can roll or move rotationally in a pre-loaded condition on the inner circumferential surface of the cylinder by the biasing means, in this invention, bounding movement of the rollers on the inner circumferential surface of the cylinder and collison of the rollers and the pistons against the inner circumferential surface of the cylinder can surely be prevented, and undesired phenomena such as scratches on the inner circumferential surface can effectively prevented.

What is claimed is:

1. A reciprocating machine comprising a support, a reciprocating member performing reciprocating motion in the support, a crank shaft peforming rotary motion, a connecting rod connected rotatably at its one end to said crank shaft and at its other end to the reciprocating member, and rolling means mounted on both side portions of the reciprocating member on a plane defined by the oscillating movement of the connecting rod, the rolling means respectively comprising a pin, a pair of rollers rotatably mounted on the pin, and a spiral spring biasing means freely mounted on the pin between the rollers for resiliently urging the rollers away from each other along the axial direction of the pin, the rollers being in rolling contact with the support to carry out rolling contact between the support and the reciprocating member.

2. The reciprocating machine of claim 1, in which each roller of the pair of rollers is arranged along a direction perpendicular to the plane defined by the oscillating movement of said connecting rod.

3. The reciprocating machine of claim 1 or 2, in which said reciprocating member has openings disposed on opposite sides of a skirt portion thereof, the pin being respectively mounted in each of said openings and extending in a direction perpendicular to the plane defined by the oscillating movement of said connecting rod.

4. The reciprocating machine of claim 1 or 2, in which the reciprocating member constitutes a piston and the support constitutes a cylinder.

5. The reciprocating machine of claim 1 or 2, in which each of said rollers comprises a roller bearing, an outer ring of said roller bearing has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

6. The reciprocating machine of claim 1 or 2, in which each of said rollers comprises needle bearing, an outer ring of said needle bearings has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

7. A reciprocating machine comprising a support, a reciprocating member performing reciprocating motion in the support, a crank shaft performing rotary motion, a connecting rod connected rotatably at its one end to said crank shaft and at its other end to the reciprocating member, and rolling means mounted on both side portions of the reciprocating member on a plane defined by the oscillating movement of the connecting rod, the rolling means respectively comprising a pin, a pair of rollers rotatably mounted on the pin, a biasing means freely mounted on the pin between the rollers for resiliently urging the rollers away from each other along the axial direction of the pin, the rollers being in rolling contact with the support to carry out rolling contact between the support and the reciprocating member, and means for retaining the biasing means at a predetermined position between opposite surfaces of said rollers.

8. The reciprocating machine of claim 7, in which said retaining means comprises recesses on the opposite surfaces of the rollers.

9. The reciprocating machine of claim 7, in which said retaining means comprises a ring mounted on the pin between the rollers.

* * * * *